United States Patent [19]

Harmoning et al.

[11] Patent Number: 5,207,869
[45] Date of Patent: May 4, 1993

[54] EVAPORATIVE REDUCTION OF WASTE LIQUID

[75] Inventors: H. David Harmoning, Andover; Guy Marchesseault, Boxford, both of Mass.

[73] Assignee: Clivus Multrum, Inc., Lawrence, Mass.

[21] Appl. No.: 658,193

[22] Filed: Feb. 20, 1991

[51] Int. Cl.$^5$ .............. B01D 1/00; C02F 1/04
[52] U.S. Cl. .................. 159/16.1; 159/44; 159/47.3; 159/901; 202/154; 202/206; 203/1; 203/49; 203/DIG. 5
[58] Field of Search .............. 159/16.1, 901, 44, 47.3; 203/1, 71, 49, DIG. 5, DIG. 18; 202/206, 154, 181; 261/DIG. 72, DIG. 65, 75

[56] References Cited

U.S. PATENT DOCUMENTS

| | | | |
|---|---|---|---|
| 3,358,739 | 12/1967 | Pinkerton et al. | 159/44 |
| 3,361,649 | 1/1968 | Karter | 159/44 |
| 3,843,463 | 10/1974 | Brown | 159/16.1 |
| 4,040,973 | 8/1977 | Szivos et al. | 159/16.1 |
| 4,203,837 | 5/1980 | Hoge et al. | 210/705 |
| 4,236,974 | 12/1980 | Kühnlein | 203/25 |
| 4,302,424 | 11/1981 | Miyake et al. | 210/264 |
| 4,608,175 | 8/1986 | Nuttle | 210/532.2 |
| 5,069,796 | 12/1991 | Fox | 210/664 |

FOREIGN PATENT DOCUMENTS

| | | | |
|---|---|---|---|
| 0142603 | 5/1985 | European Pat. Off. | 159/47.3 |
| 0295722 | 12/1988 | European Pat. Off. | 159/47.3 |

Primary Examiner—Virginia Manoharan
Attorney, Agent, or Firm—Hamilton, Brook, Smith & Reynolds

[57] ABSTRACT

A liquid waste reduction system uses an evaporator having two packed columns. A reservoir of the evaporator has three level sensor which monitor the fluid level in the reservoir. An input pump delivers waste liquid to the reservoir. When the fluid level has exceeded a low level, a control unit powers an output pump which pumps liquid from the base of the reservoir to an external storage unit. A distributor pump pumps liquid from the reservoir to the top of the packed columns. A blower forces air upward through the packing material to evaporate water from the liquid. When the fluid level has exceeded a high level, the control unit switches on a heating element which heats the air delivered from the blower to the second packed column, thus accelerating the evaporation process. When the fluid level has exceeded the maximum level, the control unit deactivates the input pump to prevent flooding of the evaporator unit.

13 Claims, 3 Drawing Sheets

EVAPORATIVE REDUCTION OF WASTE LIQUID

BACKGROUND OF THE INVENTION

Disposal of human waste has traditionally been difficult in remote, heavily trafficked areas. For example, many public restrooms in state and national parks can not be readily connected to sewage treatment facilities, and environmental considerations often prohibit the use of septic systems.

One technique used is the composting of feces and treating of urine such as is described in co-pending application Ser. No. 07/624,861, "System and Method for Composting Feces and Treating Urine", by Carl Lindstrom. However, the location of such a system is often such that the compost liquid output the system can not be simply discharged, but must be stored and transported to a disposal site. Storage containers therefore often require regular emptying if the system is used with any particular frequency.

SUMMARY OF THE INVENTION

The present invention provides a collection and reduction system for reducing the storage volume of waste liquid such as the output from a human waste compost system. The system uses a two stage evaporator having a first packed column and a second packed column. Waste liquid is pumped into a reservoir of the of the evaporator with an input pump, which is preferably a metering pump. Waste liquid is drawn from the reservoir by a distributor pump which pumps the liquid to a first distributor and a second distributor. The first distributor distributes waste liquid it receives at the top of the first packed column. The second distributor distributes the waste liquid it receives at the top of the second packed column. In the preferred embodiment, each distributor includes a dispersion element such as a conical deflector, so that the waste liquid is dispersed throughout the packed column.

Included with the evaporator is a blower which forces a gas, preferably air, into each of the packed columns. The gas is introduced in the packed columns below the packing material of each column such that as waste liquid travels downward through the packing material of the columns, gas from the blower travels upward through the columns evaporating water from the liquid. The two packed columns are in fluid communication near the top of the evaporator, and an exhaust port is provided at the top of the evaporator through which gas and water vapor exits.

In the preferred embodiment, gas from the blower is transported to the packed columns through two separate conduits. A first gas conduit transports gas from the blower to the first packed column. A second gas conduit transports gas from the blower to the second packed column. Associated with the second gas conduit is a heating element which when operated heats the gas passing through the second gas conduit. In the preferred embodiment the heating element is a resistive heating element.

For removing concentrated liquid waste from the reservoir of the evaporator, an output conduit is provided which draws waste from the bottom of the reservoir. An output pump linked to the output conduit pumps the liquid waste from the reservoir to an external storage container. The level of liquid in the reservoir is monitored with level sensors each of which provides an output signal to a control unit of the evaporator. The control unit receives the signals from the level sensors and responds by providing output signals to each of the input pump, output pump, distributor pump, blower, and heating element.

In the preferred embodiment, the evaporator uses a high level sensor, a low level sensor, and a maximum level sensor. Each of the sensors is positioned along a wall of the reservoir. While the level of the waste liquid is below the height of the low level sensor, the input pump is operating and the output pump and the distributor pumps are idle. At this time the blower and the heating element are both off. When the level of the waste liquid rises above the height of the low level sensor, the control unit generates signals which turn on the blower, the output pump, and the distributor pump. When the liquid level rises above the height of the high level sensor, the control unit generates a signal which turns on the heating element. When the fluid level rises above the height of the maximum level sensor, the input pump is shut off to prevent flooding of the evaporator unit.

DETAILED DESCRIPTION OF A PREFERRED EMBODIMENT

Figure 1:
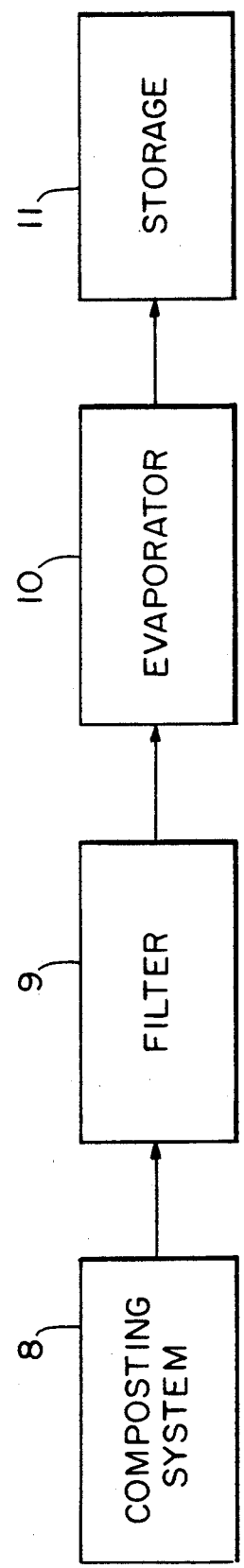
FIG. 1 is a block diagram showing the functional relationship of the present invention relative to a composter and a storage container.

FIG. 1 is a block diagram demonstrating the functionality of the present invention. A human waste composting and processing system 8 is a system such as that taught in co-pending application Ser. No. 07/624,861, which is incorporated herein by reference. Such a composting system has an output of liquid waste product which may require storage and transportation for disposal purposes. In FIG. 1, the compost liquid is output to a filter 9 which removes any remaining solid matter which exits the composting system. The filter may be any of a number of different well known filters such as a sand or gravel filter. A storage unit 11 is used for eventual storage of the waste. However, before storing, the volume of the waste is reduced by evaporator unit 10. The evaporator unit 10 continuously reduces the volume of the output from the composting system, as is discussed hereinafter, and thus improves the efficiency of the waste storage.

Figure 2:
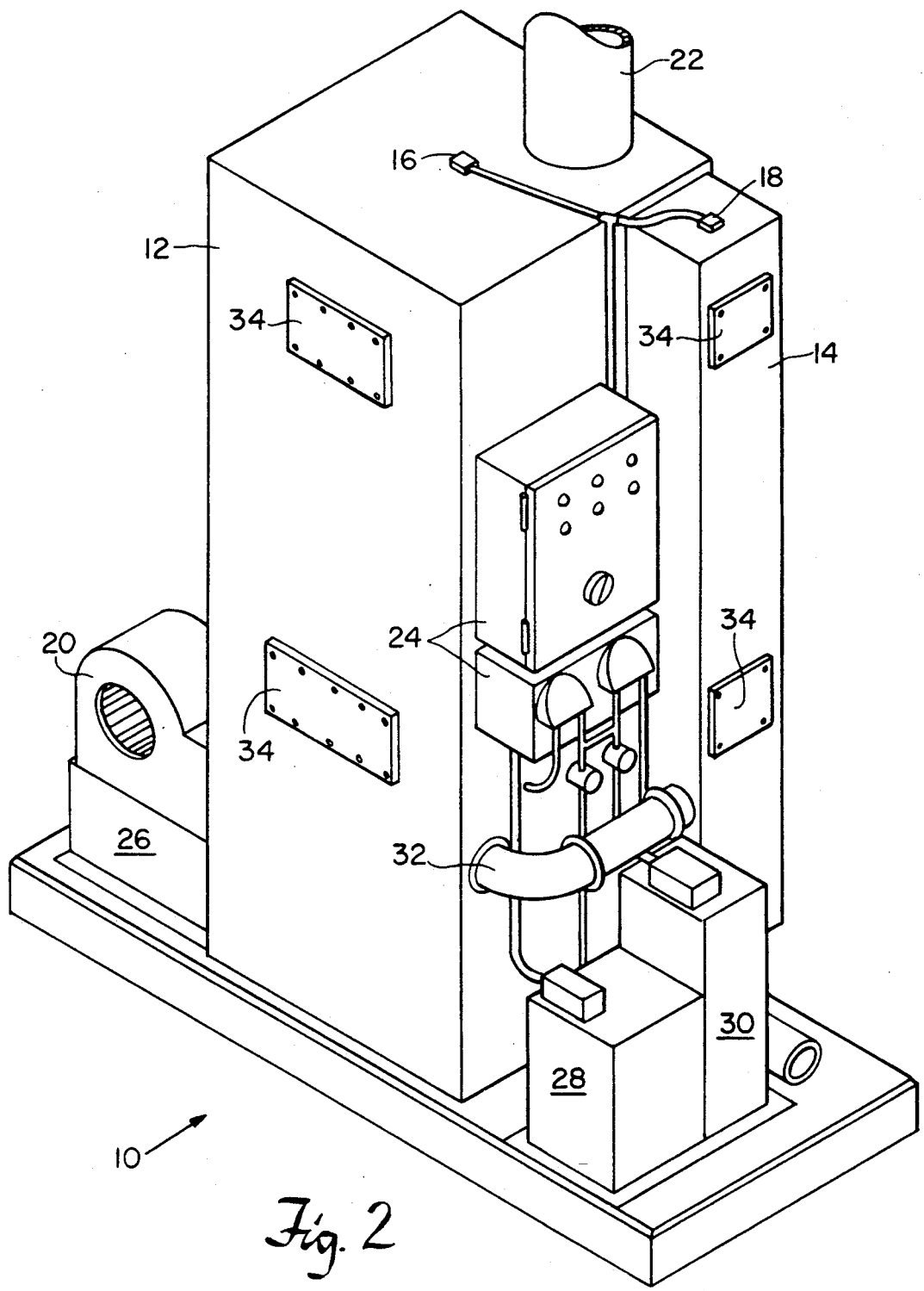
FIG. 2 is a perspective view of an evaporator unit of the present invention.

FIG. 2 is a perspective view of the evaporator of the present invention. The evaporator 10 has a first packed column 12 adjacent a second packed column 14. Each column uses some conventional packing material as is commonly known in the art. In the preferred embodiment, the packing is Actifil Bioring 40, manufactured by Aercor, Inc. This packing has a surface area of 42 ft$^2$ft$^3$, and provides a void space of about 91%. However, other packing material may be used without departing from the spirit and scope of the invention.

Compost liquid is transported from a reservoir in the base of the first evaporator 10 and input to the top of the columns 12, 14 via distributors 16, 18. The liquid then travels downward through the packed columns and collects again in the reservoir. A blower 20 is used to force air into the packed columns, to increase evaporation of water from the liquid travelling downward through the packed columns. The blower forces air separately into each of the first column 12 and the second column 14. The packed columns are separated by a partition which is open at the top to allow air flow from the top of the second column 14 into the top of the first column 12. Air and water vapor which blows up through the columns then exits through output stack 22.

Control unit 2 includes monitoring circuitry and output control circuitry for receiving signals from sensors inside the evaporator and providing output control signals to operate components of the evaporator. Output pump 26 is shown under blower 20, and pumps concentrated waste product out of the reservoir and into storage container 11. Input pump 28 pumps compost liquid from filter 9 into the reservoir of the evaporator. Distributor pump 30 pumps liquid from the reservoir to the distributors 16, 18 at the top of the packed columns.

As shown in FIG. 2, a gas conduit from blower 20 passes though the lower portion of packed column 12 and transports gas from blower 20 to the second packed column 14. Heating of the gas flowing through conduit 32 is provided by a heating element (not shown in FIG. 2). In the preferred embodiment, the heating element is a resistive heating coil located within the conduit 32. Also shown in FIG. 2 are access ports 34 which allow access to the inside of the packed columns 12, 14. Operation of the evaporator 10 will be more completely understood from the following description which refers to FIG 3.

Figure 3:
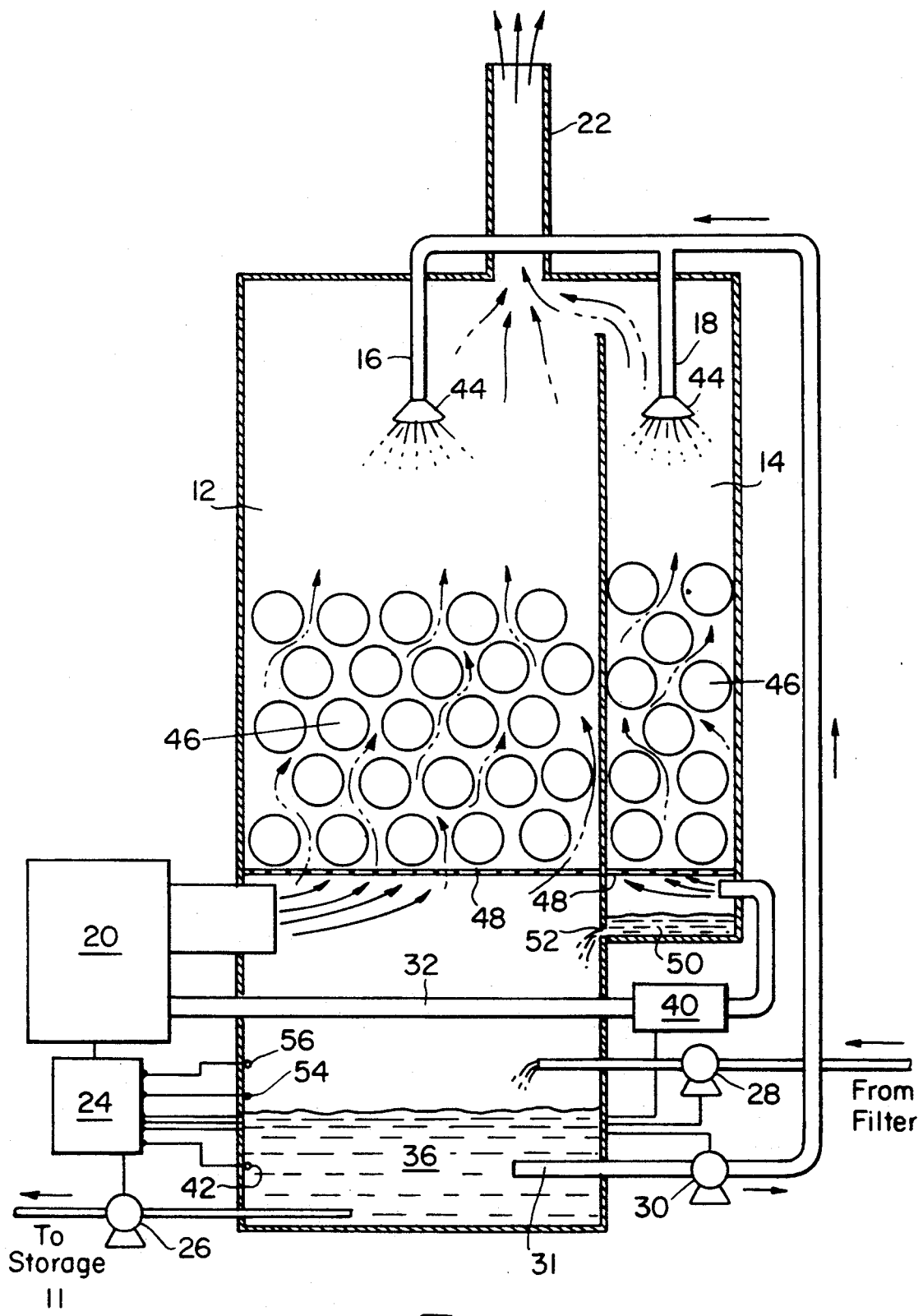
FIG. 3 is a schematic illustration demonstrating the operation of the present invention.

FIG. 3 illustrates schematically the operation of an evaporator 10 according to the present invention. Compost liquid is pumped from filter 9 into the top region of the evaporator reservoir 36 by input pump 28. Similarly, concentrated liquid is drawn out of the reservoir 36 and pumped to storage container 11 by output pump 26. The output pump draws from the bottom of the reservoir 36 since the most concentrated liquid resides at the bottom. Thus, only the most concentrated waste is output to the storage container 11.

The control unit 24 is an electrical switching circuit which generates predetermined output signals in response to particular input signals. In the preferred embodiment, the control unit uses a digital logic circuit, but any applicable switching circuit, such as an analog circuit or even a microprocessor-based circuit, may be used as an alternative. The fluid level in the reservoir 36 is monitored by the control unit through the use of sensors 42, 54, 56 attached to a wall of the reservoir. The sensors are optical sensors in the preferred embodiment, but other types of level sensors may alternatively be used. Each of the sensors 42, 54, 56 generates an output signal to the control unit 24 which changes when the fluid level in the reservoir reaches the height of that particular sensor. In response to the inputs from the sensors, the control unit generates output signals to each of the pumps 26, 28, 30, blower 20, and heating element 40. These output signals control the operation of each of these components, and allows the evaporator to properly reduce the compost liquid volume while maintaining a controlled fluid level in the reservoir 36.

When the fluid level in the reservoir 36 is below the level of low level sensor 42, the control unit outputs from the control unit 20 are such that input pump 28 is operating, bringing compost liquid into the reservoir 36. However, output pump 26 is idle at this time, as is distributor pump 30. The blower 20 and the heating element 40 are also not powered. When the fluid volume in the reservoir 36 increases to exceed the height of the low level sensor 42, the control unit switches on the output pump 26, the blower 20 and the distributor pump 30. Thus, the low level sensor level is a minimum level necessary for initiating the evaporation process.

Operation of the distributor pump 30 results in the drawing of fluid from the reservoir 36 to the distributors 16, 18 of the evaporator. As shown in the figure, the level from which the distributor pump draws is slightly lower than the height of the low level sensor. Thus, the fluid is drawn from as high in the reservoir 36 as possible while still ensuring that the fluid level does not drop below the level of distributor pump conduit 31 while the distributor pump 30 is operating. The fluid drawn by the distributor pump 30 is distributed in the packed columns by distributors 16, 18. In the preferred embodiment, these distributors are output conduits with conical deflectors 44 which disperse the liquid across the top of the packed columns 12, 14. This ensures the best distribution of the liquid throughout the packing material 46.

The illustration of the packing material shown in FIG. 3 is not necessarily intended to be representative of the actual shape or relative size of the actual packing material used. The packing material 46 of the columns 12, 14 rests on support grids 48, through which liquid may freely flow. Since the operation of blower 20 is coordinated with the operation of the distributor pump 30, the liquid which is dispersed by the distributors 16, 18 and which flows downward through the packing material 46, is highly ventilated by the air forced upward through the packing material 46 by the blower 20. This ventilation results in the rapid evaporation of water vapor in the liquid, which is then carried out through stack 22 with the forced air.

The concentrated liquid which reaches the support grid 48 of column 12 drains directly into reservoir 36. The concentrated liquid which reaches the support grid 48 of the second column 14 drains into a collection region 50, and then out through a port 52 into the reservoir 36. The collection of fluid in the collection region 50, and the relatively small size of port 52 prevent any significant air flow through the port 52 from column 14 to column 12.

The evaporation process results in a concentration of the compost liquid flowing into the reservoir. In the preferred embodiment, the pumping and evaporating functions are coordinated to optimize the system fluid balance. The input pump runs at about 2 gallons/minute, as does the distributor pump. The water vapor which is evaporated and output during the evaporation process is approximately 97% of the total fluid volume. Consequently, the output pump is set to operate at a flow rate which is 3% that of the input pump, or about 0.6 gallons/minute. However, changes in temperature or input volume can disrupt this flow balance, and therefore change the fluid level in the reservoir. The control unit 24 controls the pumps 26, 28, 30, the blower 20, and the heating element 40 to maintain the reservoir fluid level within a particular range. As mentioned above, the control unit 24 shuts off the evaporation process and the fluid output when the reservoir level drops below the low level sensor. However, the present invention also guards against the possibility of the reservoir fluid level becoming too high.

Although the fluid level in the reservoir must be prevented from increasing beyond a certain certain critical level, it is desirable to allow the input of compost liquid to continue, so as not to interrupt the operation of the composter. For this reason, the present invention is adapted to control the rate of evaporation so as to control the reservoir fluid level, while still allowing liquid input to continue.

When the reservoir fluid level rises above the height of high level sensor 54, the control unit responds to the signal from the sensor 54 by outputting a signal which turns on resistive heating element 40. As mentioned above, the heating element 40 is preferably a heating coil located inside the conduit 32 leading from the blower 20 to the second column 14. It will therefore be apparent that the schematic representation in FIG. 3 is for illustrative purposes, and is not intended to limit the invention. In fact, any form of heating element which may be controlled by an output signal from the control unit 24 may just as readily be used in place of the heating coil of the preferred embodiment.

The powering of the heating element 40 heats the air being forced by the blower into column 14, thus increasing the rate of evaporation of water vapor from the liquid traveling through the packing material of column 14. This increases the rate of concentration of the liquid, and therefore results in a gradual lowering of the fluid level in the reservoir. Once the fluid level drops below the height of the high level sensor, the heating element is returned to the off state by the control unit 20.

In the preferred embodiment, the heating element is an electrical resistance heater of 1800 Watts and the blower is a high-pressure blower which generates 850 ft$^3$/min. The pressure in each of the columns is approximately 2-3 inHg gauge, and the temperature of the air in column 14 is approximately 140° F. when the heater is operating.

Although the partial heating technique of the present invention provides an adaptable evaporator system, it is still necessary to prevent against flooding of the evaporator 10. In certain circumstances, it may be possible that the fluid level in the reservoir 36 could continue to rise even after the heating element is engaged. Thus, a third sensor, maximum level sensor 56, is located at the critical height in the reservoir above which the fluid level can not be allowed to rise. When the reservoir fluid level exceeds the height of the maximum level sensor 56, the signal from the sensor 56 causes the control unit 20 to shut down input pump 28 to prevent the introduction of more liquid into the reservoir. This is necessary to prevent the flooding of the blower 20 and other elements above the critical fluid level. When the level of the liquid in the reservoir 36 has dropped below the level of sensor 56, the input pump 28 is once again engaged to continue the introduction of compost liquid to the evaporator unit 10.

While the invention has been particularly shown and described with reference to a preferred embodiment thereof, it will be understood by those skilled in the art that various changes in form and detail may be made therein without departing from the spirit and scope of the invention as defined by the appended claims.

We claim:

1. An evaporative method for reducing the volume of waste liquid, comprising the steps of:
   a) introducing waste liquid to a first packed column, whereby the liquid passes through the first packed column and is collected in a reservoir;
   b) introducing waste liquid to a second packed column, whereby the liquid passes through the second packed column and is collected in said reservoir;
   c) forcing a gas in the same direction through the first packed column and the second packed column with a blower;
   d) evaporating water from the waste liquid;
   e) sensing the fluid level in the reservoir by a sensor; and
   f) controlling by a control unit the activation of a heating element which, in response to the fluid level, heats only the gas forced through the second packed column.

2. The method according to claim 1 further comprising recalculating concurrently the waste liquid from the reservoir to the first packed column and the second packed column with a distributor pump.

3. The method according to claim 2 wherein introducing waste liquid to the fist packed column comprises providing a first distributor which distributes waste liquid delivered by the distributor pump within the first packed column.

4. The method according to claim 2 wherein introducing waste liquid to the second packed column comprises providing a second distributor which distributes waste liquid delivered by the distributor pump within the second packed column.

5. The method according to claim 2 further comprising controlling operation of the distributor pump with the control unit such that the distributor pump is deactivated when the sensed fluid level in the reservoir drops below a predetermined level.

6. The method according to claim 1 further comprising inputting waste liquid to the reservoir with an input pump.

7. The method according to claim 6 wherein inputting waste liquid to the reservoir comprises controlling the operation of the input pump with the control unit such that the input pump is deactivated when the sensed fluid level in the reservoir exceeds a predetermined level.

8. The method according to claim 1 further comprising outputting liquid from the reservoir with an output pump.

9. The method according to claim 8 wherein outputting waste liquid from the reservoir comprises controlling the operation of the output pump with the control unit such that the output pump is deactivated when the sensed fluid level in the reservoir falls below a predetermined level.

10. The method according to claim 1 further comprising controlling the operation of the blower with the control unit such that the blower is deactivated when the sensed fluid level in the reservoir drops below a predetermined level.

11. A method according to claim 1 further comprising providing level sensors positioned at different levels in the reservoir which provide signals to the control unit indicative of the fluid level in the reservoir.

12. The method according to claim 11 wherein providing level sensors includes providing a low level sensor, a high level sensor, and a maximum level sensor.

13. An evaporative method for reducing the volume of waste liquid, comprising the steps of:
   a) introducing waste liquid to a first packed column, whereby the liquid passes through the first packed column and is collected in a reservoir;

b) introducing waste liquid to a second packed column, whereby the liquid passes through the second packed column and is collected in said reservoir;
c) forcing gas in the same direction through the first packed column and the second packed column with a blower;
d) evaporating water from the waste liquid;
e) sensing the fluid level in the reservoir by a sensor;
f) controlling by a control unit the activation of a heating element which, in response to the fluid level, heats only the gas forced through the second packed column.

g) recalculating concurrently the waste liquid from the reservoir to the first packed column and second packed column with a distributor pump;
h) controlling operation of the distribution pump with the control unit such that the distributor pump is deactivated when the sensed fluid level in the reservoir drops below a predetermined level; and
i) controlling the operation of the blower with the control unit such that the blower is deactivated when the sensed fluid level in the reservoir drops below a predetermined level.

* * * * *

UNITED STATES PATENT AND TRADEMARK OFFICE
CERTIFICATE OF CORRECTION

PATENT NO. : 5,207,869
DATED : May 4, 1993
INVENTOR(S) : H. David Harmoning and Guy Marchesseault It is certified that error appears in the above-identified patent and that said Letters Patent is hereby corrected as shown below:

Claim 3, Column 6, line 19, cancel "fist" and insert therefor --first--;

Claim 13, Column 8, line 1, cancel "recalculating" and insert therefor --recirculating--.

Signed and Sealed this

Eleventh Day of January, 1994

Attest:

BRUCE LEHMAN

Attesting Officer        Commissioner of Patents and Trademarks